United States Patent [19]
Gates

[11] Patent Number: 6,112,272
[45] Date of Patent: Aug. 29, 2000

[54] NON-INVASIVE BUS MASTER BACK-OFF CIRCUIT AND METHOD FOR SYSTEMS HAVING A PLURALITY OF BUS MASTERS

[75] Inventor: Stillman Gates, Los Gatos, Calif.

[73] Assignee: Adaptec, Inc., Milpitas, Calif.

[21] Appl. No.: 09/096,300

[22] Filed: Jun. 2, 1998

[51] Int. Cl.[7] ................................................ G06F 13/00
[52] U.S. Cl. ........................................ 710/129; 710/110
[58] Field of Search .................................. 710/110, 129, 710/130, 240

[56] References Cited

U.S. PATENT DOCUMENTS

| | | | |
|---|---|---|---|
| 5,212,795 | 5/1993 | Hendry | 710/28 |
| 5,278,959 | 1/1994 | Corcoran et al. | 710/110 |
| 5,442,769 | 8/1995 | Corcoran et al. | 710/130 |
| 5,596,729 | 1/1997 | Lester et al. | 710/128 |
| 5,603,050 | 2/1997 | Wolford et al. | 710/1 |
| 5,790,869 | 8/1998 | Melo et al. | 710/240 |
| 5,884,095 | 3/1999 | Wolford et al. | 710/25 |

FOREIGN PATENT DOCUMENTS 0 125 095 A1  11/1984  European Pat. Off. ........ H04L 11/16

*Primary Examiner*—Glenn A. Auve
*Attorney, Agent, or Firm*—Gunnison, McKay & Hodgson, LLP; Forrest Gunnison

[57] ABSTRACT

A non-invasive processor bus master back off enables bus mastership to be changed without interrupting execution of time critical routines of the current bus master. The current bus master recognizes when a time critical routine is being executed. Thus, if a request to back-off the bus is received while a time critical routine is being executed, the current bus master completes execution of the time critical routine prior to pausing and relinquishing the bus to the requesting bus master. Non-invasive back-off structure includes a bus; a first bus master coupled to the bus where the first bus master executes routines that transfer data over the bus; a second bus master coupled to the bus; and a non-invasive back-off circuit coupled to the first and second bus masters. The non-invasive back-off circuit generates a back-off pause enablement signal that enables transfer of control of the bus from the first bus master to the second bus master only when execution of a routine by the first bus master is not time critical.

18 Claims, 5 Drawing Sheets

NON-INVASIVE BUS MASTER BACK-OFF CIRCUIT AND METHOD FOR SYSTEMS HAVING A PLURALITY OF BUS MASTERS

BACKGROUND OF THE INVENTION

1. Field of the Invention

The present invention relates generally to host adapters, and more particularly, I/O bus interface circuits, either host adapters or targets, on an I/O bus, that include a plurality of bus masters for an internal communication bus.

2. Description of Related Art

Prior single chip host adapters have included a plurality of modules and an on-chip processor that controlled operation of the modules. For example, U.S. Pat. No. 5,659,690, entitled "Programmably Configurable Host Adapter Integrated Circuit Including a RISC Processor," issued on Aug. 19, 1997 to Stuber et al., which is incorporated herein by reference, had an internal bus that coupled the various modules to a sequencer that included a RISC processor.

Specifically, a SCSI module 130, a sequencer 120, data FIFO memory circuit 160, a memory 140, and a host interface module 110 were interconnected by an internal chip I/O bus CIOBUS, which was used for control of host adapter integrated circuit 100 both by a host microprocessor 170 through a host adapter driver 165 and by sequencer 120. Internal chip I/O bus CIOBUS included (i) a source bus with separate eight bit address and data buses, (ii) a destination bus with separate eight bit address and data buses, and (iii) a plurality of control signal lines. Internal chip I/O bus CIOBUS supported high speed normal operations that were controlled by sequencer 120 as well as slower but extended operations during error recovery that were controlled by host adapter driver 165 using host microprocessor 165.

The splitting of internal chip I/O bus CIOBUS into source and destination buses allowed each sequencer instruction to be completed in a single sequencer clock cycle, as opposed to the multiple cycles needed on a shared bus. Further, in some cases, a write operation and a read operation were performed simultaneously over internal chip I/O bus CIOBUS.

Both host adapter driver 165 and sequencer 120 were bus masters of bus CIOBUS. To prevent contentions on bus CIOBUS, when host adapter driver 165 wanted control of bus CIOBUS, host adapter driver 165 set a bit PAUSE in host adapter 100. When bit PAUSE was set, sequencer 120 paused and set a bit PAUSEACK. Upon setting of bit PAUSEACK, control of bus CIOBUS was transferred from sequencer 120 to host adapter driver 165 so that host adapter driver 165 could access any register in the address space of bus CIOBUS. Host adapter driver 165 polled bit PAUSEACK to determine when bus CIOBUS was available.

Thus, bus CIOBUS was operated in two modes defined by the state of bit PAUSEACK. When bit PAUSEACK was in the inactive state, bus CIOBUS supported both a write operation and a read operation within a single sequencer clock cycle, and was controlled by sequencer 120. When bit PAUSEACK was in the active state, the I/O system board or any other bus master through host interface module 110 could access any registers in host module 110 as well as any registers in host adapter 100 that were on bus CIOBUS.

Sequencer 120 could be paused at any time during normal operation. However, this could result in poor performance. If sequencer 120 was performing a time sensitive task, and was paused before the task was completed, the pause would effectively abort the task and require that the complete task be restarted after the pause.

Thus, prior art host adapter 100 used signals PAUSE and PAUSEACK, e.g., hold and grant signals, to arbitrate control of bus CIOBUS (for transferring the use of the bus from one bus master to another bus master). For example, the requesting bus master, host adapter driver 165, activated a hold signal, signal PAUSE, to the current bus master, sequencer 120, and in response, the current bus master completed its current instruction, released bus CIOBUS, and activated a grant signal, set bit PAUSEACK, to the requesting bus master to indicate that sequencer 120 had backed off bus CIOBUS.

In response to the grant signal, the requesting bus master changed its bus signals to the driven state and became a second bus master. When use of bus CIOBUS was completed by the second bus master, the second bus master released bus CIOBUS and inactivated the hold signal, signal PAUSE, indicating to the first bus master that bus CIOBUS was available. The first bus master deactivated the grant signal, changed its bus signals to the driven state, and continued processing a possibly interrupted routine.

When the pause occurred during a routine that involved a timing feature, the routine's timing requirement may not have been met and the result was erratic behavior. If the designer failed to recognize all time critical possibilities prior to completion of the design, software work arounds may not be possible and consequently the circuit may fail to function properly. A method is needed to control when and if an on-chip sequencer is paused to provide the performance needed in multi-tasking host adapters and to assure that all time-critical routines are completed in a normal manner without interruption.

SUMMARY OF THE INVENTION

According to the principles of this invention, a non-invasive processor bus master back off enables bus mastership to be changed without interrupting execution of time critical routines of the current bus master. In particular, the current bus master recognizes when a time critical routine is being executed. Thus, if a request to back-off the bus is received while a time critical routine is being executed, the current bus master completes execution of the time critical routine prior to pausing and relinquishing the bus to the requesting bus master.

In one embodiment, the routines executed by the primary bus master are written such that between execution of each routine, an access is made to a selected address to determine the address of next routine to be performed. The address of the instruction performing this access is stored in a register. A comparator circuit compares each instruction address being used, e.g., a current process address with the stored address stored. When the stored address equals the current process address as indicated by the comparator circuit, and another bus master has issued a back-off pause request, e.g., a hold signal, the current bus master backs off the bus after completing the current instruction and indicates this by generating an active back-off pause acknowledge signal, e.g., a grant signal.

In response to active back-off pause acknowledge signal, the requesting bus master takes control of the bus. When the requesting bus master completes its bus activities and deactivates the back-off pause request signal, the primary bus master deactivates the back-off pause acknowledge signal and resumes control of the bus.

With the non-invasive processor master back-off capability of this invention, design timing conditions not recognized during development can be worked around with software routine changes thereby reducing the risks of design failure for current and future applications. Further, in one embodiment, to allow for access of the instruction whose address is stored without responding to an active back-off pause request signal, which may be necessary for a work around, a back-off pause disable bit is provided that may be used to temporarily delay responding to a back-off pause request.

In general, according to the principles of this invention, in a system that includes two or more bus masters for a bus, one bus master is the current bus master, and any one of the other bus masters can be a back-off pause requesting bus master. Typically, the current bus master is a processor that, when master of the bus continually executes routines that utilize the bus. Many of these routines control tasks that are time-critical in nature, and require completion within a prescribed time period.

When another of the bus masters requests access to the bus, the current bus master releases the bus to the requesting bus master only when the current bus master reaches a non-time critical point in the execution of the current routine. Hence, unlike the prior art host adapters that simply paused the sequencer as soon as possible upon receiving a request to use the bus, the current bus master, in the present invention, relinquishes control of the bus only when a point is reached in the execution of the current task that does not adversely affect performance of the task, i.e., non-invasive back-off is utilized. This enhances the overall performance of the system relative to the prior art systems, and more importantly assures that the system functions properly.

The structure of this invention includes a bus; a first bus master coupled to the bus where the first bus master executes routines that transfer data over the bus; a second bus master coupled to the bus; and a non-invasive back-off circuit coupled to the first and second bus masters. The non-invasive back-off circuit generates a back-off pause enablement signal that enables transfer of control of the bus from the first bus master to the second bus master only when execution of a routine by the first bus master is not time critical.

The non-invasive back-off circuit includes a back-off register coupled to the first bus master by the bus. The first bus master loads an address in the back-off register. A comparator has a first input connected to the back-off register, a second input connected to an address bus of the first bus master, and an output terminal. The comparator compares the address stored in the back-off register with an address on the address bus of the first bus master, and generates an active signal on the output terminal upon the addresses having a predefined relationship.

A logic gate, e.g., an AND gate, has a first input terminal connected to output terminal of the comparator; a second input terminal and an output terminal. A back-off pause request line is coupled to the second input terminal of the logic gate. The logic gate generates an active signal on the output terminal in response to an active signal from the output terminal of the comparator, and an active signal on the back-off pause request signal. The active signal on the output terminal of the logic gate drives the back-off pause enablement signal.

The non-invasive back-off circuit also includes a back-off pause disable bit coupled to a third input terminal of the logic gate.

In one embodiment, the non-invasive back-off circuit includes an arbitration circuit that processes non-invasive back-off requests from a plurality of bus masters to a primary bus master. If only a single non-invasive back-off request is received in a fixed time period, typically a clock cycle, the arbitration circuit gives the single request priority. Any subsequent non-invasive back-off request is held-off until the request having priority is withdrawn. If multiple requests are made within the fixed time period, the arbitration circuit gives one of the multiple requests priority and masks the other requests until the priority request is withdrawn.

BRIEF DESCRIPTION OF THE DRAWINGS

In the following description, elements with the same reference numeral are the same or equivalent elements.

DETAILED DESCRIPTION

Figure 1:
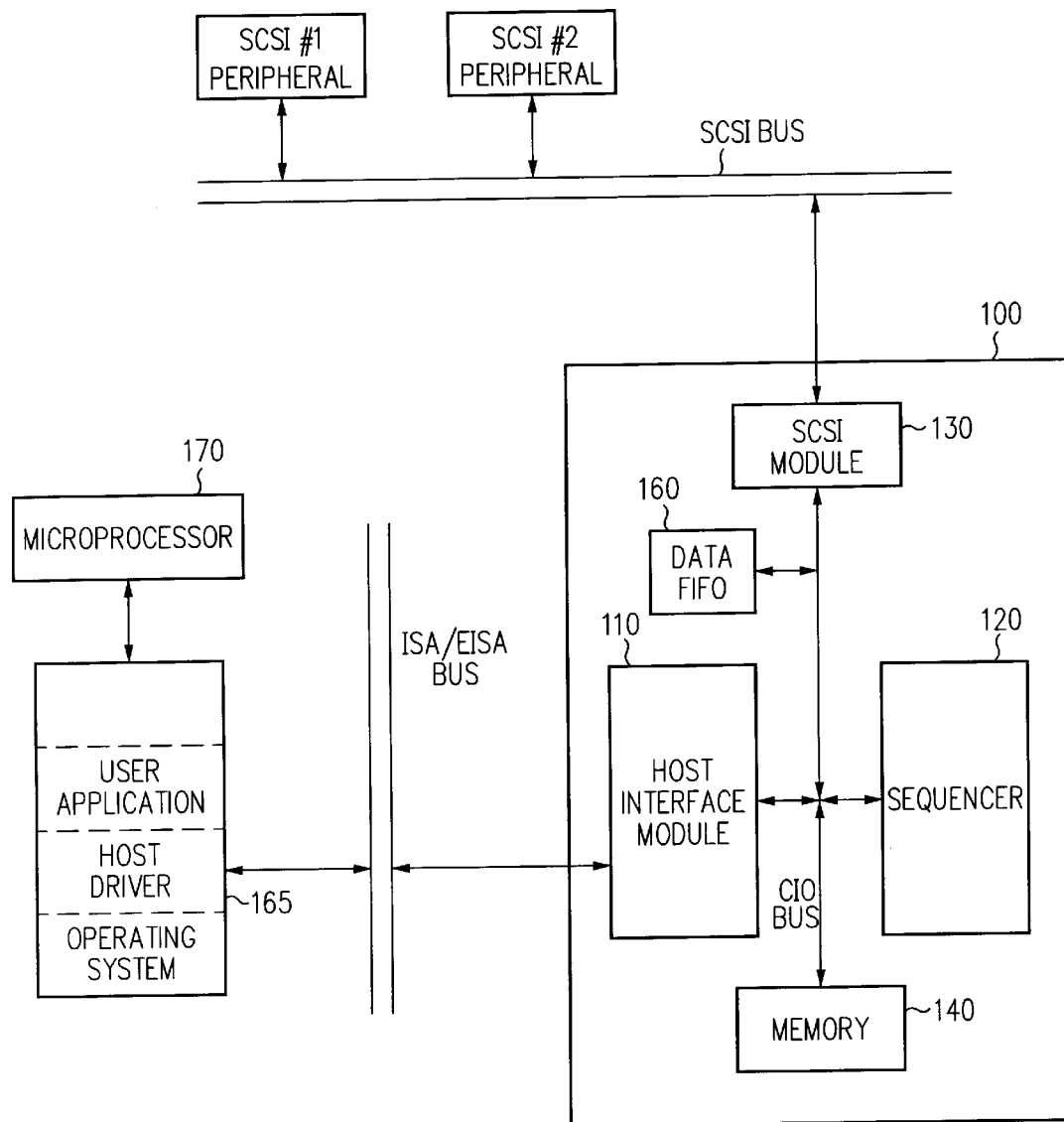
FIG. 1 is a block diagram of a host adapter with an internal bus that had multiple bus masters.

The present invention provides a non-invasive processor bus master back-off, which transfers control from one bus master to another bus master without interrupting a time critical routine being executed by the one bus master. In one embodiment, this non-invasive processor bus master back off is included in a multi-tasking host adapter 200 (FIG. 2) that includes a plurality of on-chip bus masters for an internal cooperative communication bus CCB. In addition, a host computer driver can be a bus master of internal cooperative communication bus CCB. According to the principles of this invention, a multitasking protocol engine MTPE is the primary bus master of cooperative communication bus CCB. Host interface block HST and command management channel block CMC also include bus masters of bus CCB.

To gain access to cooperative communication bus CCB, one of the other bus masters sends an active back-off pause request signal to multitasking protocol engine MTPE, the current bus master. In response to the active back-off pause request signal, multitasking protocol engine MTPE continues to execute the current task until a non-critical portion of the task is reached, e.g., the end of the task, or at least a portion that does not affect the performance of host adapter 200. At that time, multitasking protocol engine MTPE backs off cooperative communication bus CCB and acknowledges the active back-off pause request signal. Upon receipt of the acknowledgement of the active back-off pause request signal, the other bus master takes control of bus CCB. Hence, control of bus CCB was transferred without affecting the execution of the time-critical routine by the primary bus master.

In general, according to the principles of this invention, in a system that includes two or more bus masters, one bus master is the current bus master, and any one of the other bus masters can be a back-off pause requesting bus master. Typically, the current bus master is a processor that, when master of the bus continually executes routines that utilize the bus. Many of these routines control tasks that are time-critical in nature, and require completion within a prescribed time period.

When another of the bus masters requests access to the bus, the current bus master releases the bus to the requesting bus master only when the current bus master reaches a non-time critical point in the execution of the current routine. Hence, unlike the prior art host adapters that simply paused the sequencer as soon as possible upon receiving a request to use the bus, the current bus master, in the present invention, relinquishes control of the bus only when a point is reached in the execution of the current task that does not adversely affect performance of the task, i.e., non-invasive back-off is utilized. This enhances the overall performance of the system relative to the prior art systems, and more importantly assures that the system functions properly.

Hence, the non-invasive processor bus master back-off process of this invention enables the bus mastership to be changed without invading time critical routines of the current bus master (e.g., for non-time critical interrupts such as parity errors). This requires that the current bus master recognize when a non-time critical point in execution of a routine is reached. Thus, if a request to back off the bus is received while in a time critical routine, a response to the request is delayed until the time critical routine is completed, a non-critical execution point is reached.

Figure 2:
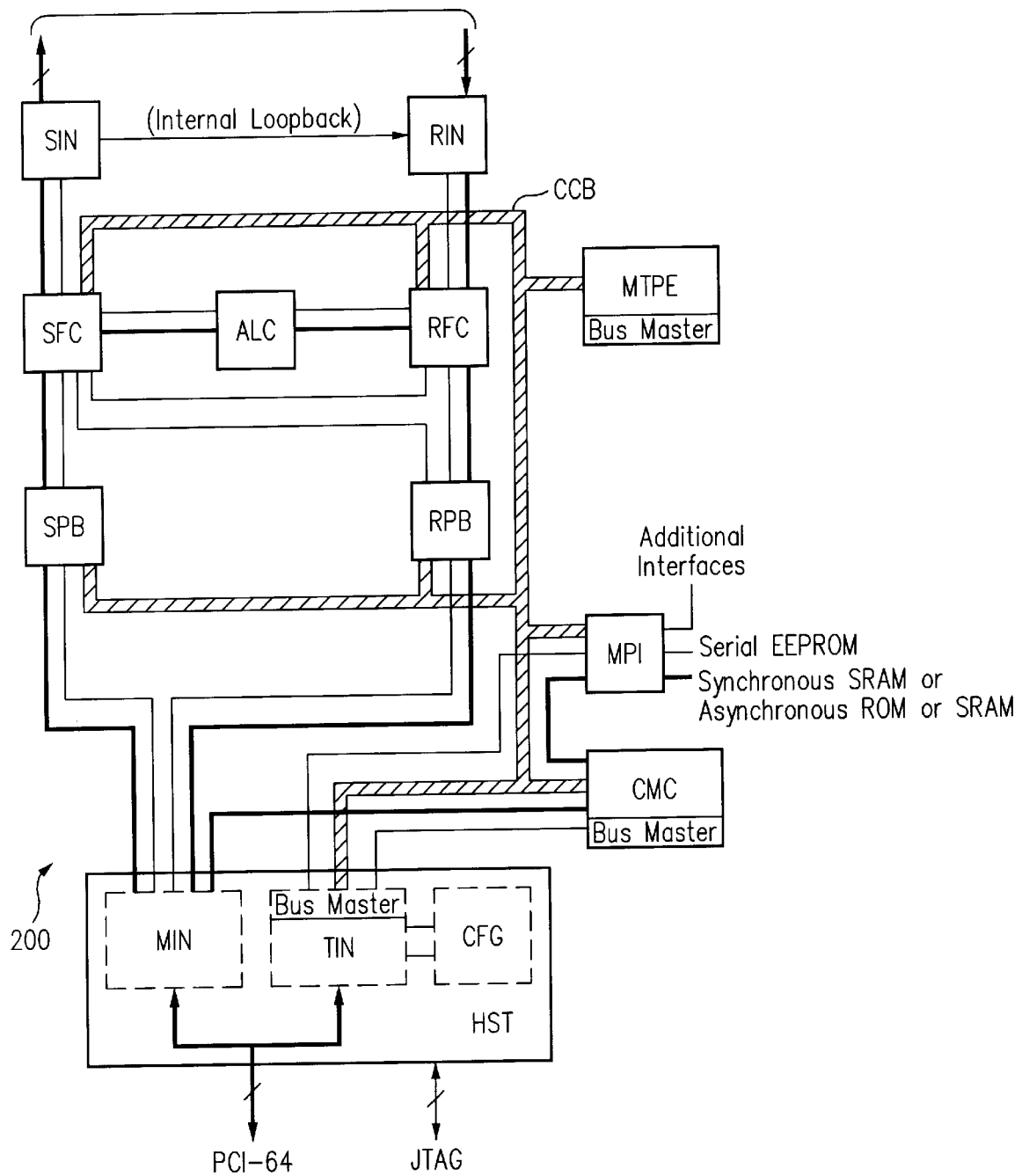
FIG. 2 is a block diagram of a host adapter that includes the novel non-invasive processor bus master back off of this invention.

In the embodiment of FIG. 2, cooperative communication bus CCB provides communication data paths between all internal modules that require firmware and software support. Specifically, cooperative communication bus CCB interconnects a send frame control block SFC, a receive frame control block RFC, a send payload buffer SPB, a receive payload buffer RPB, a multitasking protocol engine MTPE, a memory port interface block MPI, a command management channel block CMC, and a transfer in module TIN in a host interface block HST.

In this embodiment, multitasking protocol engine MTPE, command management channel block CMC, and host interface module block HST can function as bus masters of cooperative communication bus CCB. Command management channel block CMC and host interface module block HST each contain a DMA engine. Multitasking protocol engine MTPE includes a RISC processor, sometimes referred to as a sequencer, that executes firmware to control the multi-tasking of host adapter 200 by executing commands in I/O hardware command blocks transferred to host adapter 200 by a driver in a host computer (not shown).

Host adapter 200 also includes a send interface block SIN that interconnects the fibre channel send parallel to series converter and send frame control block SFC; a receive interface block RIN that interconnects the fibre channel receive series to parallel converter and receive frame control block RFC; and an arbitration loop control block ALC interconnected between send and receive frame control blocks SFC and RFC. The actual functionality of each of the various blocks in host adapter 200 is not essential to this invention and so the different blocks are presented only to demonstrate an example of a host adapter integrated circuit that effectively utilizes the non-invasive processor bus master back-off of this invention in transferring control of the operation of cooperative communication bus CCB to another bus master.

As in the prior art, a driver in a host computer can pause multi-tasking protocol engine MTPE and read or write command block transfer instructions for command management channel block CMC. The non-invasive processor bus master back off of this invention is available externally, in one embodiment, on a monitor port.

In one embodiment, the DMA engine in command management channel block CMC is used to transfer information over the 64-bit PCI bus between a memory in the host computer and command memory of command management channel block CMC. The modules within host interface block HST receive initialization and configuration information from multitasking protocol engine MTPE; transfer data from the PCI bus to send payload buffer SPB; and transfer data from receive payload buffer RPB to the PCI bus.

Multitasking protocol engine MTPE configures command management channel block CMC over cooperative communication bus CCB to enable DMA transfers of transfer control blocks (TCBs) over the PCI bus and through cooperative communication bus CCB to a TCB array, to enable DMA transfers of Scatter/Gather list elements from host computer memory over the PCI bus to a TCB queue, and DMA transfers of pointers to completed TCBs onto a done queue in the host computer memory.

Receive interface block RIN and receive frame control block RFC handle all incoming frames from the fibre channel. Receive frame control block RFC passes frame payloads to receive payload buffer RFC. Initially, multitasking protocol engine MTPE configures receive frame control block RFC to enable block RFC to commence operation, and monitors the status of receive frame control block RFC over cooperative communication bus CCB.

Send interface block SIN and send frame control block SFC handle transfer of all outgoing frames to the fibre channel. Send frame control block SFC retrieves data from send payload buffer SPB and creates payloads. Send frame control block SFC attaches headers to the payloads and send interface block SIN drives the payloads onto the fibre channel 192. Initially, multitasking protocol engine MTPE configures send frame control block SFC to enable block SFC to commence operation, and monitors the status of send frame control block SFC over cooperative communication bus CCB.

Each of blocks MTPE, SFC, RFC, HST, and CMC operates independently from each of the other blocks. At given point in time, each of blocks SFC, RFC, HST, and CMC can be executing a different task. The task executed by a block is specified by a TCB.

A more detailed description of one embodiment of the cooperative communication bus is presented in copending, commonly filed, and commonly assigned U.S. patent application Ser. No. 09/088,812, entitled "SOURCE-DESTINATION RE-TIMED COOPERATIVE COMMUNICATION BUS," of Stillman Gates, of which the summary, detailed description and the corresponding figures are incorporated herein by reference. In particular, FIG. 9 of that application is a timing diagram for a bus master switch on cooperative communication bus CCB. Cooperative communication bus CCB includes: a communication source data bus CSDAT and a communication source address bus CSADR; a communication destination data bus CDDAT, and a communication destination address bus CDADR; and a communication control bus CCTRL.

Communication source data bus is a sixteen-bit communication source data bus CSDAT[15:0]. Communication source data bus CSDAT[15:0] is divided into a low-byte communication source data bus CSDATL[7:0] and a high-byte communication source data bus CSDATH[15:8]. Both buses CSDATH[15:8] and CSDATL[7:0] are three-state driven buses with bus hold-cells that are pre-charged to a logic one level when a power-on-reset signal POR is active. In another embodiment, multiplexers are used to drive the buses used in this invention in place of three-state buffers. The way that the buses are driven is not essential to this invention.

The communication source address bus for communication source data bus CSDAT[15:0] is communication source address bus CSADR[8:0]—. (Herein, either a minus sign, or a "_L" at the end of a reference numeral indicates that a signal on the bus or line is active low. Further, reference numerals that are identical except for ending in either a minus sign or "_L" are the same reference numeral.) In one embodiment, communication source address bus CSADR [8:0]— is a three-state driven bus with bus hold-cells that are precharged to a logic one level when a power-on-reset signal POR is active.

Communication destination data bus is a sixteen-bit communication destination data bus CDDAT[15:0]. Communication destination data bus CDDAT[15:0] is divided into a low-byte communication destination data bus CDDATL [7:0] and a high-byte communication destination data bus CDDATH[15:8]. Both destination data buses CDDATH [15:8] and CDDATL[7:0] are constantly driven buses with no bus-hold cells.

The communication destination address bus for communication destination data bus CDDAT[15:0] is communication destination address bus CDADR[8:0]—. In one embodiment, communication destination address bus CDADR[8:0]— is a three-state driven bus with bus hold-cells that are precharged to a logic one level when the power-on-reset signal POR is active.

Figure 3A:
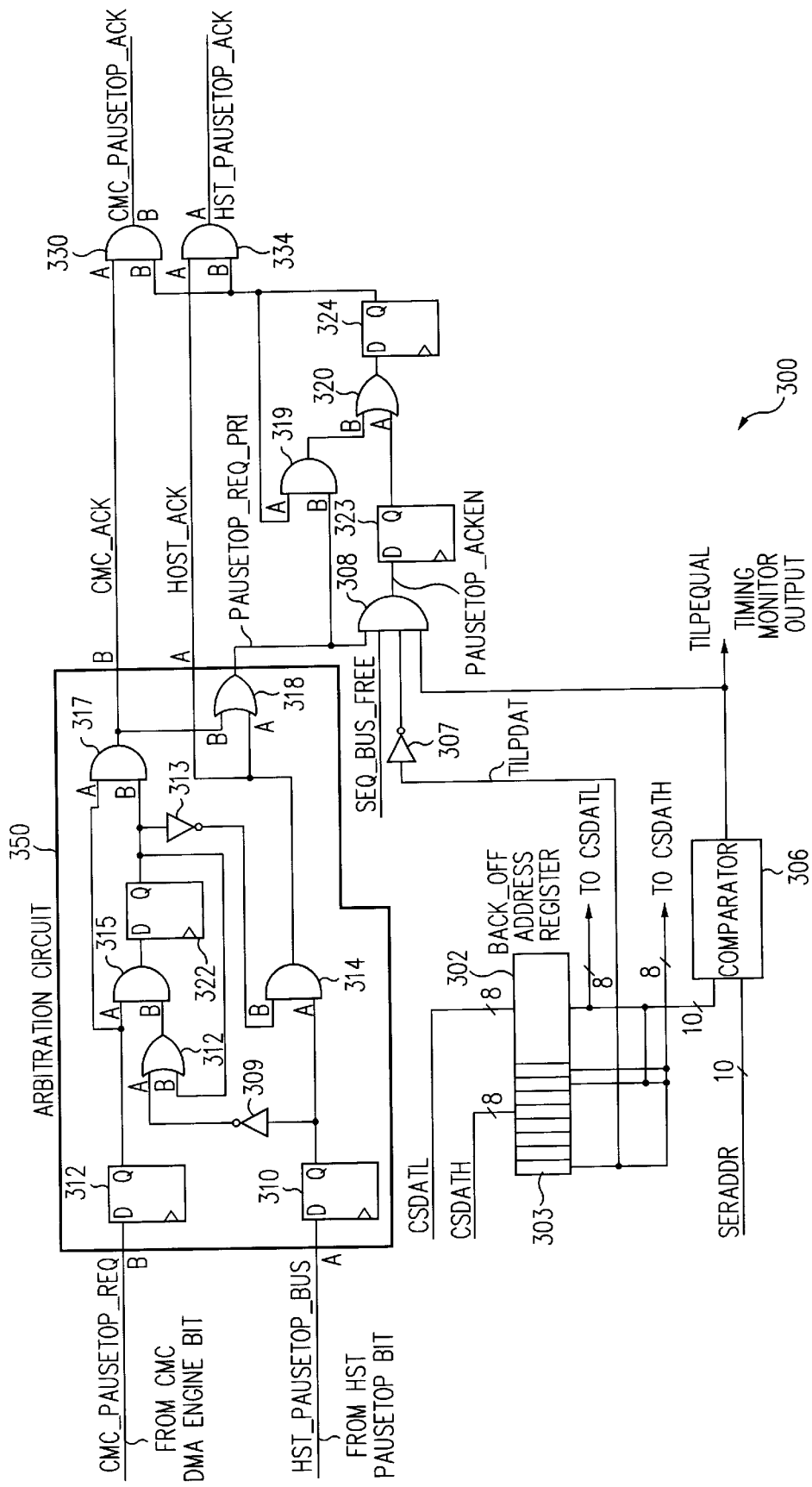
FIG. 3A is a high-level circuit diagram of one embodiment of a non-invasive processor bus master back-off circuit, according to the principles of this invention.

FIG. 3A is a diagram of a non-invasive bus master back-off circuit 300 in host adapter 200 in accordance with one embodiment of the present invention. According to the principles of this invention, routines executed by a bus master are written so that between each routine an access is made to a selected address to determine the next routine to be performed.

For example, when multitasking protocol engine MTPE is executing a task, multitasking protocol engine MTPE transfers processing to an idle loop whenever there is going to be a significant delay in performing the task. The idle loop is a string of instructions that tests for and/or controls testing for completion of events to be performed. Multitasking protocol engine MTPE either waits for an event in the idle loop, or responds to an event from the idle loop. Hence, when multitasking protocol engine MTPE is in the idle loop and an event occurs, multitasking protocol engine MTPE takes appropriate action to handle the event by executing an appropriate routine, or resuming execution of a suspended routine. Similarly, when multitasking protocol engine MTPE has completed a task, engine MTPE transfers to the idle loop. Hence, the address stored in some instances accesses an instruction that goes to the top of the idle loop routine.

In the following description, the non-invasive back-off is described in terms of the top of the idle loop, which is a non-critical point in execution of the routines where access to cooperative communication bus CCB can be switched to another bus master. However, those of skill in the art will appreciate that, in general, upon initiation of a routine, any suitable address for suspending execution of that routine can be stored, and the execution of the routine is not suspended upon the request of another bus master for access to cooperative communication bus CCB until the instruction having that address is reached in the execution of the routine.

The address of the instruction performing the access to the top of the idle loop is stored in a back-off register 302. In the embodiment of FIG. 3A, the sequencer in multitasking protocol engine MTPE uses ten bit addresses. Therefore, the address is written to back-off register 302 using low-byte communication destination data bus CDDATL, and the two least-significant bits of high-byte communication destination data bus CDDATH.

Also, in this embodiment, the most significant bit in back-off register 302, which is also written to register 302 using high-byte communication destination data bus CDDATH, is a back-off pause disable bit 303. When back-off pause disable bit 303 has a first state, e.g., cleared, there is no affect on the operation of non-invasive processor bus master back-off circuit 300. However, when back-off pause disable bit 303 has a second state, i.e., set, the operation of non-invasive processor bus master back-off circuit 300 is inhibited. Thus, back-off pause disable bit 303 provides additional flexibility in delaying response to a request from another bus master for access to cooperative communication bus CCB. In addition, in another embodiment, this bit can be used to control operation of circuit 300 without requiring a request from another bus master, which is useful in developing workarounds.

The address stored in back-off register 302 drives a first input of a comparator circuit 306. A second address is provided to a second input of comparator circuit 306 on sequencer address bus SEQADDR in multitasking protocol engine MTPE. When the address stored in register 302 and the address on sequencer address bus SEQADDR are the same address, i.e., have a predefined relationship, comparator circuit 306 generates an active signal on output line TILPEQUAL to a first input terminal of AND gate 308

Back-off pause disable bit 303 in register 302 drives a back-of pause disable line TILPDIS that is connected to an input terminal of inverter 307. The output terminal of inverter 307 is connected to a second input terminal of AND gate 308.

A third input terminal of AND gate 308 is driven by a signal on a sequencer bus free line SEQ_BUS_FREE. The signal on SEQ_BUS_FREE line is active when a bus stretch signal is inactive, a sequencer opcode COMPARE signal is inactive and a sequencer bus cycle start signal is inactive. If any one of these signals is active, an active signal cannot be generated on line SEQ_BUS_FREE.

In more general terms, the active signal on sequencer bus free line SEQ_BUS_FREE indicates that the sequencer is in a state to relinquish access to cooperative communication bus CCB if so requested, the sequencer will not start the next instruction cycle. Each of the signals used to block generation of an active signal on line SEQ_BUS_FREE is indicative of a state of the sequencer where the sequencer is not ready to relinquish control of cooperative communication bus CCB. In another embodiment, line SEQ_BUS_FREE is not included in circuit 300 and so AND gate 308 is only a three-input AND gate.

When the sequencer has completed the last bus access cycle in the time critical routine, and a host bus master back-off pause request bit, a command management channel bus master back-off pause request bit, or both are set, the sequencer places bus CCB in an idle state. Lines from the plurality of back-off pause request bits are input lines to arbitration circuit 350. A fourth input terminal of AND gate 308 is coupled to an output signal PAUSE_TOP_REQ_PRI on one output line from arbitration circuit 350. The state of the signal on priority request line PAUSE_TOP_REQ_PRI depends on the function of circuit 350, which is now considered.

When another bus master wants to obtain access to cooperative communication bus CCB from the primary bus master in multitasking protocol engine MTPE, that bus master issues a non-invasive back off request to the primary bus master by setting a non-invasive back-off pause request bit associated with that bus master. In this embodiment, there are two other possible bus masters. The bus master in command management channel block CMC sets a DMA engine bit CMC_PAUSETOP_BIT, which functions as the non-invasive back-off pause request bit for that block. The bus master in host interface block HST sets a host pause top bit HST_PAUSETOP_BIT, which functions as the non-invasive back-off request bit for that block.

Figure 3B:
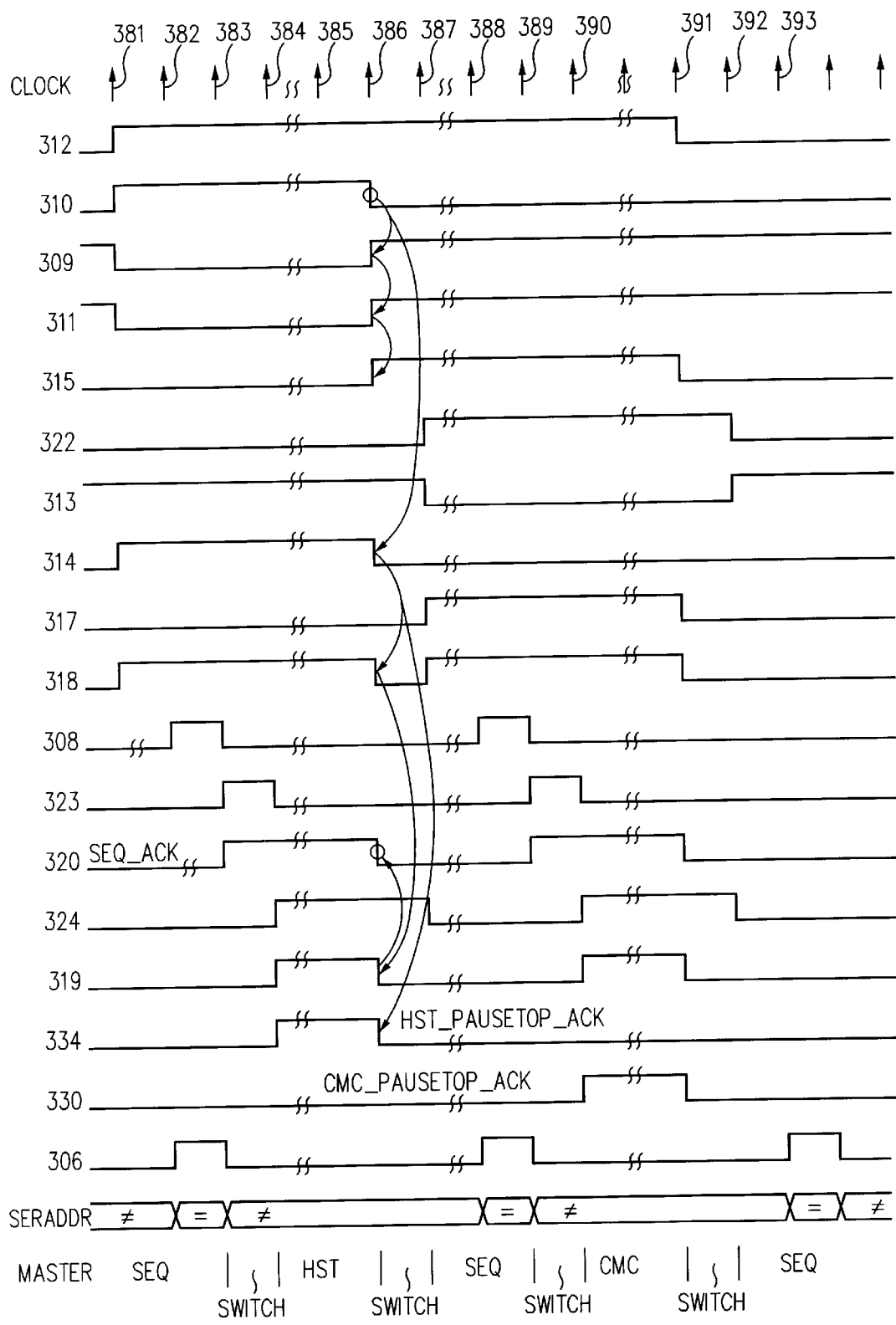
FIG. 3B is a timing diagram that illustrates the arbitration and operation of the circuit of FIG. 3A.

A set host pause top bit HST_PAUSETOP_BIT drives an active signal on a first non-invasive pause request input line HST_PAUSETOP_REQ to arbitration circuit 350. A set DMA engine bit CMC_PAUSETOP_BIT drives an active signal on a second non-invasive pause request input line CMC_PAUSETOP_REQ to arbitration circuit 350. In FIG. 3B, which is a timing diagram for the operation of a non-invasive bus master back-off circuit 300, on first active clock edge 381 (which is represented by an arrow pointing up) of clock signal CLOCK, the signals on both line CMC_PAUSETOP_REQ and line HST_PAUSETOP_REQ are active.

The active signal on first non-invasive pause request line HST_PAUSETOP_REQ drives an input terminal D of a D-type flip-flop 310. Output terminal Q of D-type flip-flop 310 is connected to a first input terminal of AND gate 314 and to an input terminal of inverter 309, which in turn drives a first input terminal of an OR gate 311. The output signal from OR gate 311 drives a second input terminal of an AND gate 315. All flip-flops in FIG. 3 are clocked by the same clock signal CLOCK, which also is used as the bus clock signal for bus CCB. Thus, in response to edge 381, the active signal on line HST_PAUSETOP_REQ is driven on output terminal Q of flip-flop 310, which in turn results in an inactive signal on the second input terminal of AND gate 315.

The active signal on second non-invasive pause input line CMC_PAUSE_REQ drives an input terminal D of a D-type flip-flop 312. Output terminal Q of D-type flip-flop 312 is connected to a first input terminal of AND gate 315. Thus, AND gate 315 has an active signal on the first input terminal, and an inactive signal on the second input terminal. Consequently, in response to edge 381, an inactive signal is driven on an output terminal of AND gate 315 that is connected to an input terminal D of a D-type flip-flop 322.

Prior to clock edge 381, it is assumed that the signal on line CMC_PAUSETOP_REQ was inactive, and so an inactive signal was clocked on an output terminal Q of flip-flop 322 by edge 381. The signal on output terminal Q of flip-flop 322 drives a second input terminal of AND gate 317. A first input terminal of AND gate 317 is driven by the signal on output terminal Q of flip-flop 312. The resulting inactive output signal of AND gate 317 drives a second non-invasive acknowledge line CMC_ACK. Therefore, at clock edge 381, the inactive output signal of AND gate 317 drives a second non-invasive acknowledge output line CMC_ACK of circuit 350.

The inactive signal on output terminal Q of flip-flop 322 also drives a second input terminal of OR gate 311, and an input terminal of an inverter 313. The active output signal of inverter 313 drives a second input terminal of AND gate 314. Thus, in response to clock edge 381, both input signals to AND gate 314 are active and so AND gate 314 drives an active signal on a first input terminal of OR gate 318 and an active signal on a first non-invasive acknowledge output line HST_ACK of circuit 350.

A second input terminal of OR gate 318 is driven by the inactive output signal of AND gate 317. The active output signal of OR gate 318 drives non-invasive request priority acknowledge output line PAUSETOP_REQ_PRI of circuit 350.

The output signals on lines CMC_ACK, HOST_ACK, and PAUSETOP_REQ_PRI of circuit 350 do not change on subsequent active clock edges of signal CLOCK, until one of the non-primary bus masters resets the pause request bit for that bus master. Consequently, in this ,embodiment, when the bus master in command management channel block CMC requests a non-invasive bus back off by the primary bus master in multitasking protocol engine MTPE (i) in the same clock cycle, or (ii) in a clock cycle after the bus master in host interface block HST has made a non-invasive back-off request and the cycle is prior to the bus master in host interface block HST clearing that request, the non-invasive back-off request from block HST is given priority.

Those of skill in the art will appreciate that when multiple new back-off requests are issued within a defined time period, the back-off request given priority can be chosen based upon the particular application and the operations performed by the competing bus masters. Therefore, circuit 350 is illustrative only of the principles of this invention and is not intended to limit the invention to the specific embodiment described.

Returning to the timing diagram of FIG. 3B and the operation of AND gate 308, after edge 381, AND gate 308 receives active signals on all input line except line TILPEQUAL. As shown in sequencer address trace SEQADDR (FIG. 3B), the sequencer address is not equal to the address stored in register 302 and so the output signal from comparator 306 on line TILPEQUAL is inactive at edge 381.

On clock edge 382, the address on sequencer bus SEQADDR equals the address stored in register 302. Recall that when the addresses are equal, this means that the sequencer has reached a non-critical time region, and in this embodiment, bus CCB is idle. When the addresses are equal, the signal on non-invasive address back-off line TILPEQUAL goes active which in turn drives the output signal of AND gate 308 active. The active output signal of AND gate 308 drives an input terminal D of D-type flip-flop 323. The signal on output terminal Q of flip-flop 323 drives a first input terminal of OR gate 320. A second input terminal of OR gate 320 is driven by an output signal of AND gate 319.

The output signal of OR gate 320 drives an input terminal Q of D-type flip-flop 324. The signal on output terminal Q of flip-flop 324 drives a second input terminal of AND gate 330, a second input terminal of AND gate 334, and a first input terminal of AND gate 319. A second input terminal of AND gate 319 is driven by the signal on non-invasive request priority acknowledge line PAUSETOP_REQ_PRI from OR gate 318.

Hence, on clock edge 383, the active output signal of AND gate 308 is clocked into flip-flop 323. In addition, the address on bus SEQADDR is no longer equal to the address in register 302, and so the output signal of comparator 306 goes inactive. This drives the output signal of AND gate 308 inactive. Also, the sequencer relinquishes control of bus CCB, as indicted by state switch in the row labeled MASTER of FIG. 3B.

The active signal on output terminal Q of flip-flop 323 drives the output signal of OR gate 320 active. Thus, after clock edge 383, the input signal to flip-flop 324 is active.

On clock edge 384, an active signal is driven on output terminal Q of flip-flop 324, which in turn drives an active signal on the second input terminal of AND gate 334. A first input terminal of AND gate 334 is driven by the active signal on first non-invasive acknowledge output line HST_ACK from the output terminal of AND gate 314. Hence, clock edge 384 results in an active signal being driven on a first non-invasive pause request acknowledge line HST_PAUSETOP_ACK by AND gate 334. The active signal from flip-flop 324 also drives the output signal of AND gate 319 active. Thus, the output signal of OR gate 320 remains active even though the output signal from flip-flop 323 has gone inactive. Upon the signal on line HST_PAUSETOP_ACK going active, the bus master in host interface block HST takes control of bus CCO.

The bus master in host interface block HST maintains control of bus CCB for a number of clock cycles, and nothing changes within circuit 300 during this time. Thus, a break is shown in the timing diagram during this interval. Hence, active clock edges 384 and 385 of signal clock CLOCK should not be interpreted as representing active edges in adjacent clock cycles.

On clock edge 385, the bus master in host interface block HST resets host bus master back-off pause bit HST_PAUSETOP_BIT and places bus CCB in an idle state. The inactive signal is clocked through flip-flop 310 by clock edge 386. The inactive signal from flip 310 causes multiple changes. The output signal of invertor 309 is driven active, which in turn drives the output signal of OR gate 311 active, which in turn drives the output signal of AND gate 315 active.

The inactive signal from flip-flop 310 drives the output signal of AND gate 314 inactive, which in turn drives the output signal of OR gate 318 inactive. The inactive output signal of OR gate 318 drives the output signal of AND gate 319 inactive, which in turn drives the output signal of OR gate 320 inactive. The inactive signal of AND gate 314 also drives the output signal of AND gate 334 inactive. In response to the inactive input signal to AND gate 334, the active signal on first non-invasive pause acknowledge line HST_PAUSETOP_ACK is taken inactive by AND gate 334.

On active clock edge 387 and the bus master in multitasking protocol engine MTPE takes control of bus CCB. Also, the active signal from AND gate 315 is clocked to output terminal Q of flip-flop 322. The active signal from flip-flop 322 drives the output signal of invertor 313 inactive, and the output signal of AND gate 317 active. The active output signal of AND gate 317 drives the output signal of OR gate 318 active, and drives an active signal on line CMC_ACK to a first input terminal of AND gate 330. Also, active clock edge 387, clocks the inactive signal from OR gate 320 through flip-flop 324.

The state of circuit 300 does not change until the bus master in multitasking protocol engine MTPE places bus CCB in an idle state and generates an address on bus SEQADDR that matches the address stored in register 302. Thus, a break is shown in the timing diagram during this interval. Hence, active clock edges 387 and 388 of signal clock CLOCK should not be interpreted as representing edges in adjacent clock cycles.

On active clock edge 388, the addresses match and comparator 306 drives an active signal on line TILPEQUAL, which in turn drives the output signal of AND gate 308 active.

Active clock edge 389 clocks the active signal from AND gate 308 to output terminal Q of flip-flop 323. The active output signal of flip-flop 323 drives the output signal of OR gate 320 to flip-flop 324 active. The signal from AND gate 308 goes inactive, because the input addresses to comparator 306 are no longer equal and so the output signal of comparator 306 goes inactive.

Active clock edge 390 clocks the active output signal of OR gate 320 to output terminal Q of flip-flop 324 which in turn drives the output signal of AND gate 330 to line CMC_PAUSETOP_ACK and to AND gate 319 active. Active clock edge 390 clocks the inactive signal to output terminal Q of flip-flop 323.

Upon the signal on line CMC_PAUSETOP_ACK being driven active by AND gate 330, the bus master in command management channel CMC takes control of bus CCB.

The bus master in command management channel block CMC maintains control of bus CCB for a number of clock cycles, and nothing changes within circuit 300 during this time. Thus, a break is shown in the timing diagram during this interval. Hence, active clock edges 390 and 391 of signal clock CLOCK should not be interpreted as representing edges in adjacent clock cycles.

On clock edge 391, the bus master in command management channel CMC resets command management channel bus master back-off pause bit CMC_PAUSETOP_BIT and places bus CCB in an idle state. The inactive signal is clocked through flip-flop 312 by clock edge 391. The inactive signal from flip-flop 312 causes multiple changes. The output signal of AND gates 315 and 317 are driven inactive. The inactive output signal of AND gate 317 drives the output signal of OR gate 318 inactive, which in turn drives the output signal of AND gate 319 inactive. The inactive output signal of AND gate 319 drives the output signal of OR gate 320 inactive. The inactive output signal of AND gate 317 also drives the output signal of AND gate 330 inactive. In response to the inactive input signal to AND gate 330, the active signal on second non-invasive pause acknowledge line CMC_PAUSETOP_ACK is taken inactive by AND gate 330.

On active clock edge 392, the bus master in multitasking protocol engine MTPE takes control of bus CCB. Also, the inactive signal from AND gate 315 is clocked to output terminal Q of flip-flop 322. The inactive signal from flip-flop 322 drives the output signal of invertor 313 active, and holds the output signal of AND gate 317 inactive. Also, the inactive signal from OR gate 320 is clocked through flip-flop 324. The inactive output signal on output terminal Q of flip-flop 324 holds the signals on the output terminals of AND gates 330 and 334 inactive.

This completes the cycle of non-invasive back off. In view of the above description, the operation of circuit 300 is apparent when only one of the other bus-masters asserts a non-invasive processor back-off request and so the description is not simply repeated here with one of the two input requests inactive.

Figure 4:
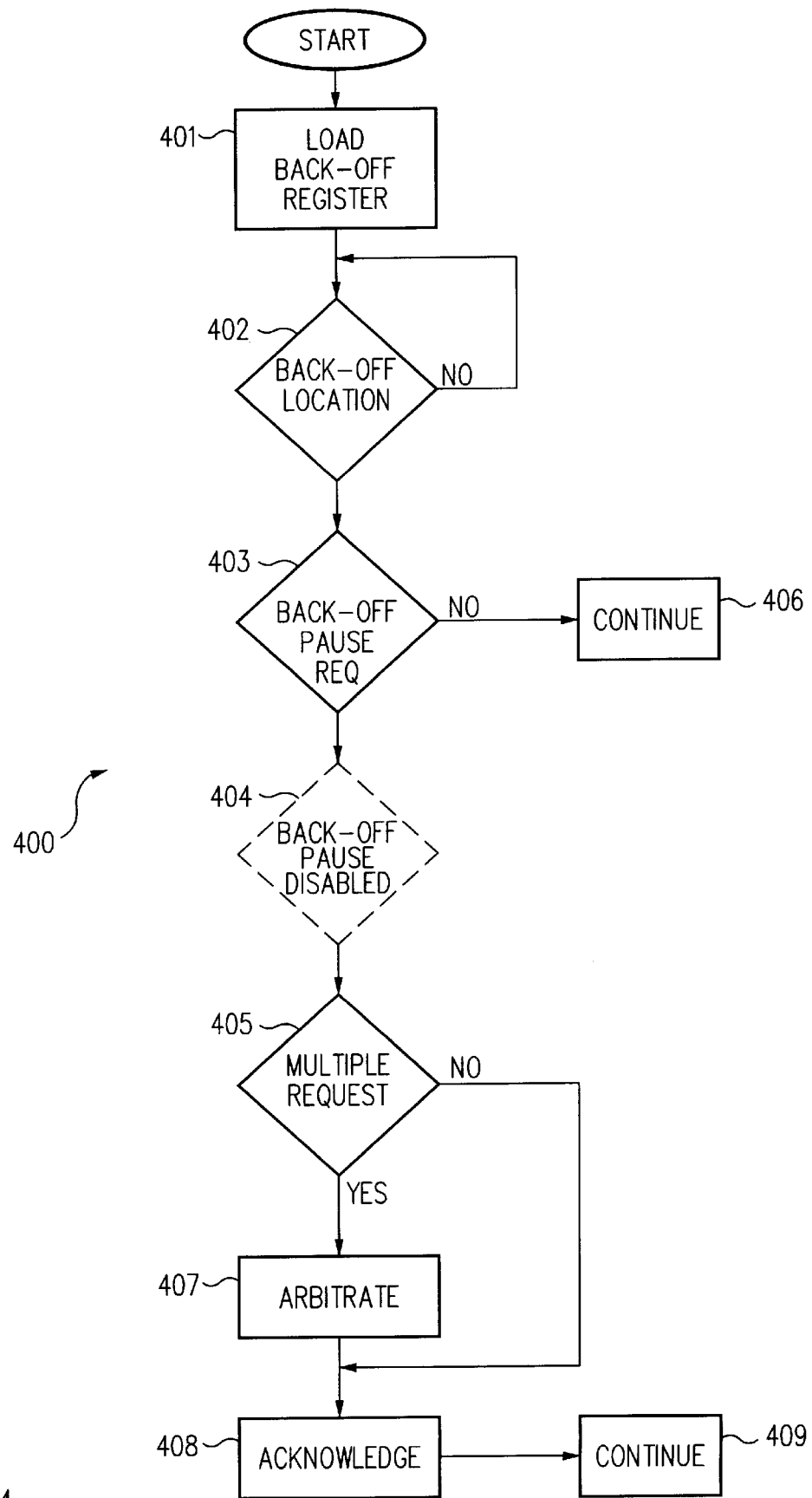
FIG. 4 is a process flow diagram of the non-invasive processor bus master back off in accordance with one embodiment of the present invention for changing the bus master of a bus shared by two or more bus masters.

FIG. 4 is a process flow diagram of the non-invasive processor bus master back off in accordance with one embodiment of the present invention for changing the bus master of a bus shared by two or more bus masters. In particular, the pausing of the sequencer in multitasking protocol engine MTPE is performed using a process 400 that does not interrupt time critical routines being performed by the current bus master, multitasking protocol engine MTPE.

In one embodiment, routines executed by multitasking protocol engine MTPE are written so that between execution of each routine or upon suspension of execution of each routine, an access is made to a selected address to determine the next routine to be executed.

At initialization, and possibly between each routine being performed, an address is loaded in back-off register 302 in load back-off register operation 401. This address is used by a routine, when that routine has reached a non-critical point, to determine the next routine to call which in turn means that execution of the currently executing routine can be interrupted and control of bus CCB transferred from the primary bus master to another bus master. Operation 401 transfers to back-off location check 402.

Back-off location check 402 compares a current execution address driven on a bus by multitasking protocol engine MTPE, i.e., the primary bus master, with the address stored in back-off register 402. If the two addresses are different, processing returns to check 402 to process the next execution address driven on the bus by multitasking protocol engine MTPE. Hence, according to the principles-of this invention, no action is taken with respect to changing the bus master until multitasking protocol engine MTPE reaches a point in the execution of the current routine that has previously been identified as being at a non-critical point.

When the current execution address matches the stored back-off address, e.g., has a predefined relation to the stored back-off address, check 402 transfers to back-off pause request check 403. If another bus master on bus CCB has issued a back-off pause request, check 403 transfers to back off pause disabled check 404, which checks the state of the most significant bit of the address loaded in operation 401, and otherwise to continue operation 406. In this instance, continue operation 406 executes the instruction addressed by the address in back-off register 402 and processing continues without a bus master change.

Conversely, if another bus master has issued a back-off pause request, processing transfers to back off pause disabled check 404. In FIG. 4, a dotted diamond is used for check 404. This indicates that check 404 is optional and can be eliminated in another embodiment in which check 403 would transfer directly to multiple requests check operation 405. As explained above, in some cases, a change of bus master may not be desired and so the back-off pause capability of this invention is disabled. In this case, check 404 simply transfers to continue operation 406, and no bus master change occurs. Conversely, if the bus master back-off capability is not disabled, check 404 transfers to multiple requests check operation 405.

In multiple request check operation 405, a check is made to determine whether more than one bus master has issued a non-invasive pause back-off request. If there is only one pending back-off request, check operation 405 transfers to acknowledge operation 408 and otherwise to arbitrate operation 407.

In arbitrate operation 407, one of the multiple pending back-off requests is assigned priority, and the remaining requests are masked. After making the priority determination, arbitrate operation 407 transfers processing to acknowledgement operation 408.

In acknowledge operation 408, the primary bus masters sends a back-off pause acknowledgement to the bus master requesting bus CCB in the case of a single request, and to the bus master given priority in the case of multiple requests. The primary bus master also relinquishes control of bus CCB. Acknowledgement operation 408 transfers to continue operation 409 in which the new bus master controls bus CCB.

When the new bus master completes the transaction on bus CCB, the new bus master withdraws the requests. In response to the withdrawn requests, the primary bus master drops the back-off pause acknowledgement, and returns processing to check operation 402 in this embodiment. This assumes that the back-off address remains the same, and is loaded during initialization. Alternatively, if the primary bus master dynamically changes the address used to determine when to perform a non-invasive processor back off, the processing returns to operation 401.

Accordingly, providing non-invasive processor master back-off capability enables the bus mastership to be changed without invading (i.e., interrupting) time critical routines of the current bus master. In particular, the present invention provides an apparatus and a method for non-invasive processor master back off. For example, the present invention can be used to provide a cost-effective and efficient bus master host adapter integrated circuit that includes non-invasive processor master back off. Also, as described above, this invention is not dependent upon any host adapter function. Consequently, this invention can also be used in a target device with an internal bus that has a plurality of bus masters. Moreover, a computer system that includes a bus master host adapter integrated circuit would significantly benefit from the apparatus and the method of the present invention.

In another application of the circuitry of this invention, the output signal of comparator 306 is used in timing analysis. In this application, an address is loaded in register 302, and the number of instructions that are executed when the address of the instruction in register 302 is executed is known. Consequently, the output signal of comparator 306 on the timing monitor output line can be used in a timing analysis. An example of an output signal from comparator 306 that would be present for the analysis without a back-off pause request present ins shown in FIG. 3B between clocks 392 and 393. This condition occurs each time comparator 306 detects the same address in register 302 and on sequencer address bus SEQ_ADDR.

Although particular embodiments of the present invention have been shown and described, it will be apparent to those skilled in the art that changes and modifications may be made without departing from the present invention in its broader aspects. Therefore, the embodiments described herein are illustrative only and are not intended to limit the invention to the specific embodiments described.

I claim:

1. An apparatus comprising:

a bus;

a first bus master coupled to the bus wherein the first bus master includes a processor that executes routines that transfer data over the bus;

a second bus master coupled to the bus; and a non-invasive back-off circuit coupled to the first and second bus masters wherein the non-invasive back-off circuit generates a back-off pause enablement signal that enables transfer of control of the bus from the first bus master to the second bus master only when execution of a routine by the processor in the first bus master is not time critical.

2. The apparatus of claim 1 wherein the non-invasive back-off circuit further comprises:

a back-off register coupled to the first bus master by the bus, wherein the first bus master loads an address in the back-off register.

3. The apparatus of claim 2 the non-invasive back-off circuit further comprises a comparator having a first input connected to the back-off register, a second input connected to an address bus of the first bus master, and an output terminal wherein the comparator compares the address stored in the back-off register with an address of the address bus of the first bus master, and generates an active signal on the output terminal upon the addresses having a predefined relationship.

4. The apparatus of claim 3 wherein the non-invasive back-off circuit further comprises:
a timing monitor output line connected to said output terminal of said comparator.

5. An apparatus comprising:
a bus;
a first bus master coupled to the bus wherein the first bus master executes routines that transfer data over the bus;
a second bus master coupled to the bus; and
a non-invasive back-off circuit coupled to the first and second bus masters wherein the non-invasive back-off circuit generates a back-off pause enablement signal that enables transfer of control of the bus from the first bus master to the second bus master only when execution of a routine by the first bus master is not time critical, and further wherein the non-invasive back-off circuit further comprises:
   a back-off register coupled to the first bus master by the bus, wherein the first bus master loads an address in the back-off register;
   a comparator having a first input connected to the back-off register, a second input connected to an address bus of the first bus master, and an output terminal wherein the comparator compares the address stored in the back-off register with an address of the address bus of the first bus master, and generates an active signal on the output terminal upon the addresses having a predefined relationship;
   a logic gate having a first input terminal connected to output terminal of the comparator; a second input terminal and an output terminal; and
   a back-off pause request line coupled to the second input terminal of the logic gate wherein the logic gate generates an active signal on the output terminal in response to an active signal from the output terminal of the comparator, and an active signal on the back-off pause request signal, and further wherein the active signal on the output terminal of the logic gate drives the back-off pause enablement signal.

6. The apparatus of claim 5 wherein the non-invasive back-off circuit further comprises:
a back-off pause disable bit coupled to a third input terminal of the logic gate.

7. The apparatus of claim 5 further comprising:
a third bus master coupled to the bus.

8. The apparatus of claim 7 wherein the non-invasive back-off circuit further comprises:
an arbitration circuit including:
   a first input line coupled to a non-invasive pause back-off bit for said second bus master;
   a second input line coupled to a non-invasive pause back-off bit for said third bus master; and
   an output line connected to said back-off pause request line so that said back-off pause request line is driven by a back-off pause request priority signal.

9. The apparatus of claim 8 wherein said second bus master always is given priority by said arbitration circuit over any other bus master.

10. A non-invasive processor bus master method for changing from a first bus master on a bus to a second bus master on the bus, the method comprising:
requesting a back-off pause by the second bus master; and
transferring control of the bus from the first bus master to the second bus master, in response to the back-off pause request, only upon reaching a non-time critical point in execution of a routine by a processor included in the first bus master.

11. The method of claim 10 further comprising:
storing an address wherein the stored address is for an instruction that is to be executed upon reaching the non-time critical point in execution by said processor included in the first bus master.

12. The method of claim 11 further comprising:
comparing another address with the stored address.

13. The method of claim 12 further comprising:
performing the transferring operation only upon the comparing operation finding that the another address and the stored address have a predefined relationship.

14. The method of claim 12 wherein said comparing is performed in a timing analysis without said requesting the back-off pause and without said transferring control.

15. The method of claim 10 further comprising:
requesting a back-off pause by a third bus master on the bus.

16. The method of claim 15 further comprising:
arbitrating between said back-off pause requests by said second and third bus masters.

17. The method of claim 16 wherein said transferring control is performed only upon said second bus master winning said arbitration.

18. The method of claim 16 further comprising:
assigning priority to said second bus master in said arbitrating.

* * * * *